United States Patent
Kerkau

[11] Patent Number: 6,050,250
[45] Date of Patent: Apr. 18, 2000

[54] DEFECT RECOGNITION DEVICE FOR INTERNAL-COMBUSTION ENGINES AND PROCESS FOR OPERATING AN INTERNAL-COMBUSTION ENGINE

[75] Inventor: Martin Kerkau, Oetisheim, Germany

[73] Assignee: Dr. Ing. h.c.F. Porsche AG, Weissach, Germany

[21] Appl. No.: 09/126,752

[22] Filed: Jul. 31, 1998

[30] Foreign Application Priority Data

Jul. 31, 1997 [DE] Germany ............................ 197 33 189
Aug. 20, 1997 [DE] Germany ............................ 197 36 064

[51] Int. Cl.$^7$ ...................................................... F02D 41/00
[52] U.S. Cl. ........................ 123/688; 123/690; 123/692; 123/90.15; 60/602
[58] Field of Search .................................... 123/688, 690, 123/691, 692, 90.15; 60/602

[56] References Cited

U.S. PATENT DOCUMENTS 4,127,088  11/1978  Ezoe ........................................ 123/688
5,247,793   9/1993  Yamada et al. ......................... 123/688

FOREIGN PATENT DOCUMENTS 38 34 711    4/1990  Germany .
41 20 426    1/1992  Germany .
195 13 156   5/1996  Germany .

Primary Examiner—Noah P. Kamen
Attorney, Agent, or Firm—Evenson, McKeown, Edwards & Lenahan, PLLC

[57] ABSTRACT

A defect recognition device is provided for internal-combustion engines, as well as a process for operating an internal-combustion engine having at least two exhaust gas trains, with one lambda probe respectively being in each exhaust gas train. A joint measuring device detects the supplied air and a joint timing device apportions the fuel. The lambda probes, which generate a continuous signal for the lambda value of the exhaust gas, are used to provide improved defect recognition. The defect recognition device recognizes a defect when the signals supplied by the lambda probes deviate from one another.

18 Claims, 2 Drawing Sheets

DEFECT RECOGNITION DEVICE FOR INTERNAL-COMBUSTION ENGINES AND PROCESS FOR OPERATING AN INTERNAL-COMBUSTION ENGINE

BACKGROUND AND SUMMARY OF THE INVENTION

This application claims the priority of German Patent Application No. 197 33 189.0, filed Jul. 31, 1997, and German Patent Application No. 197 36 064.5, filed Aug. 20, 1997, the disclosures of which are expressly incorporated by reference herein.

The invention relates to a defect recognition device for internal-combustion engines and to a process for operating an internal-combustion engine.

In general, it should be possible to recognize defects in internal-combustion engines reliably and at reasonable cost. For recognizing defects, defect recognition devices are provided, for example, which are assigned to a component of the internal-combustion engine and are capable of recognizing a defect or a defective action with respect to this component. It is obvious that in the case of such an approach a separate defect recognition device is required for every component which may possibly generate a defect.

From German Patent Document DE 195 13 156 C1, a turbo-charged internal-combustion engine is known which has a defect recognition device in which a change-over takes place from a controlling of the fed air to a timing of the fed air when a one-sided defect is recognized in one of the exhaust gas trains. For recognizing a defect in one of the exhaust gas trains, it is suggested to monitor the internal-combustion engine to determine whether an accumulation of engine cutouts is occurring at one of the cylinder banks.

Furthermore, vehicles are known—for example, the Porsche 911 turbo—which have two separate exhaust gas trains and in which a lambda control is used within the scope of the fuel apportioning (metering). For the lambda control, a separate lambda probe is provided in each exhaust gas train. However, the fuel apportioning and the lambda control take place for the internal-combustion engine as a whole which drives the vehicle. In the case of a lambda value of approximately 1.0, the used lambda probes have a signal jump so that only a lambda control to the desired 1.0 value is possible.

In contrast to the state of the art, it is an object of the invention to provide an internal-combustion engine with an improved defect recognition device and process.

According to the invention, this object is achieved by a defect recognition device for an internal-combustion engine having at least two exhaust gas trains, one lambda probe respectively in the exhaust gas trains, a joint measuring device for detecting the supplied air, and a joint timing device for metering the fuel. The lambda probes generate a continuous signal for the lambda value of the exhaust gas. The defect recognition device recognizes a defect when the signal supplied by the lambda probes deviate from one another. A process according to the invention achieves the above objects by operating an internal-combustion engine, by (1) determining the lambda value of the exhaust gas for each exhaust gas train; (2) calculating the difference between the lambda values; (3) comparing the difference with a limit value; and (4) emitting a defect signal when the difference is larger than a limit value.

The invention is based on the recognition that, in the case of an internal-combustion engine where the apportioning of the fuel supply takes place for the internal-combustion engine as a whole (that is, not specifically for one part of the internal-combustion engine), a number of components affect the volumetric efficiency of the internal-combustion engine or other quantities influencing the combustion process. If these components are then provided in a multiple manner; in which case each of the components is independently assigned to a part of the internal-combustion engine, in the case of an internal-combustion engine with separate exhaust gas trains, defects can be recognized in that the exhaust gas composition of the individual exhaust gas trains is determined and is compared with the corresponding value of the other exhaust gas trains. If one of the exhaust gas trains deviates in this comparison, a conclusion can be drawn that a defect exists in this exhaust gas train or the constructional elements assigned to this exhaust gas train. Constructional elements which are accessible to such a defect recognition are, for example, fuel injection nozzles, adjusting devices for the valve stroke, adjusting devices for the position of the camshafts, ignition devices as well as all constructional elements penetrated by the exhaust gas flow.

According to the invention, it is therefore provided to use lambda probes in the case of an internal-combustion engine of the above-mentioned type which generate a continuous signal for the lambda value of the exhaust gas. The error recognition device will then recognize a defect when the signals supplied by the lambda probes deviate from one another. The lambda probes used so far do not generate a continuous signal, but rather a signal jump at a lambda value of approximately 1.0. The special advantage according to the invention is therefore the use of the continuously operating lambda probes by which it is now possible to carry out a comparison of the signals supplied by the lambda probes and to draw a conclusion from them concerning a different exhaust gas composition in the individual exhaust gas trains. Furthermore, according to the invention, a plurality of defects can be recognized by use of a single defect recognition device and a single process for recognizing defects.

Further advantageous developments of the invention are described herein.

Thus, it is provided to use the described defect recognition device in the case of a turbocharged internal-combustion engine which has separate exhaust gas trains and, in addition, as a function of a defect signal, switches from a controlling of the rate of air flow to a timing of the rate of air flow. In the case of such an internal-combustion engine, as known, for example, from German Patent Document DE 195 13 156 C1, by means of the invention, the defect signal required for a switch-over can be generated in a simple manner. Assuming in the case of such an internal-combustion engine that a lambda control is already used for the fuel apportioning, the lambda probes required for this lambda control can be used by the device for the apportioning of fuel as well as by the defect recognition device according to the invention so that no additional costs will arise.

To the extent that, in the case of an internal-combustion engine, devices are provided for adjusting the relative position of camshafts or for adjusting the valve stroke of inlet valves and/or outlet valves, a defect in one of these adjusting devices can be determined in a particularly simple manner. This is because whether the defect recognition device according to the invention emits a defect signal is examined immediately after an operating of the adjusting device. If such an examination reveals that a defect signal occurs as the reaction to the operating of the adjusting element, then the conclusion can be drawn that the defect was triggered by the just operated adjusting device and the defect can be assigned to this adjusting device.

Other objects, advantages and novel features of the present invention will become apparent from the following detailed description of the invention when considered in conjunction with the accompanying drawings.

DETAILED DESCRIPTION OF THE DRAWINGS

Figure 1:
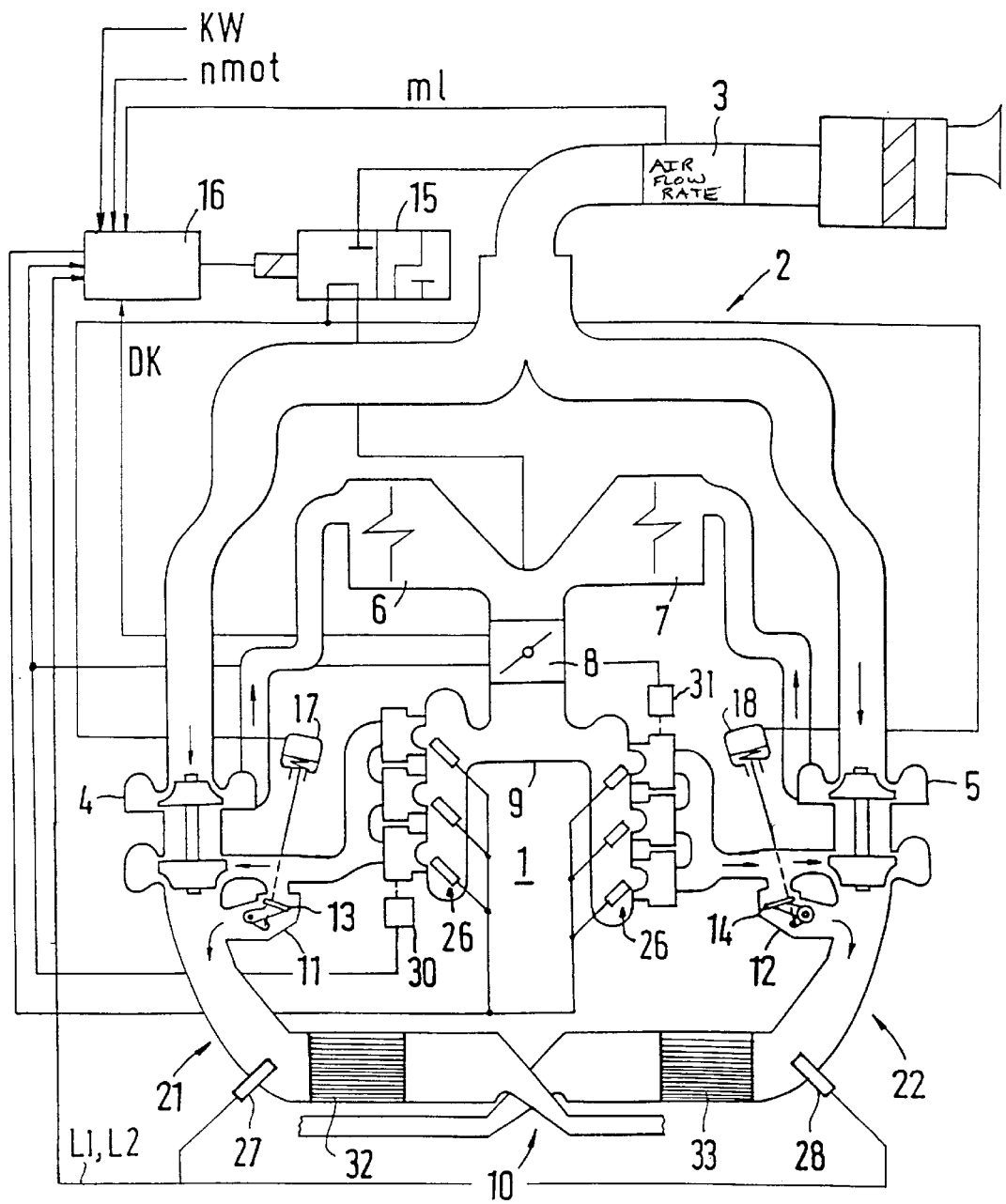
FIG. 1 is an overview of a turbo-charged internal-combustion engine.

The internal-combustion engine 1 illustrated in FIG. 1 has an air flow rate sensor 3 in an intake unit 2. Behind the air flow rate sensor 3, the intake air flow branches to a left-side exhaust gas turbocharger 4 and to a right-side exhaust gas turbocharger 5. The compressed partial intake air flows (shown by arrows) enter into separate charge air coolers 6, 7. Behind the charge air coolers 6, 7, the charge air is combined and flows by way of a throttle valve 8 and a distributor 9 to cylinder heads of the internal-combustion engine 1. Fuel is admixed to the intake air flow by way of fuel injection nozzles 26.

An exhaust gas system 10 has two separate exhaust gas trains 21 and 22. By way of the exhaust gas trains 21, 22, the exhaust gases of the internal-combustion engine 1 can be fed to the exhaust gas turbochargers 4, 5 or can be guided past them by way of bypass lines 11, 12 which can be closed by bypass valves 13, 14. Downstream of the exhaust gas turbochargers 4, 5, one lambda probe 27, 28 respectively is assigned to each of the exhaust gas trains 21, 22, which lambda probe 27, 28 continuously determines separately for each of the exhaust gas trains 21, 22 the value of the oxygen fraction and emits a signal L1 or L2. In the exhaust gas flow, the lambda probes 27, 28 are followed by two catalysts 32, 33.

Together with the bypass lines 11, 12, the bypass valves 13, 14 are in each case integrated in the exhaust gas turbochargers 4, 5. For triggering the bypass valves 13, 14, a joint timing valve 15 is provided which is controlled by an engine timing system 16 containing an air flow rate regulator. For triggering the bypass valves 13, 14, the timing valve 15 uses a vacuum which is taken out of the intake system 2 at a removal point in front of the throttle valve 8. One diaphragm cell 17, 18 respectively is used as the actuator. By means of the timing valve 15, the control pressure onto the diaphragm cells 17, 18 can be adjusted arbitrarily between ambient pressure and the pressure existing behind the charge air coolers 6,7. The control pressure against the diaphragm surface acts against the spring force. The diaphragm path is guided by way of a linkage for adjusting the bypass valves 13, 14. The leading away of the bypass exhaust gas takes place into the considerably opened turbine outlet diffuser.

Figure 2:
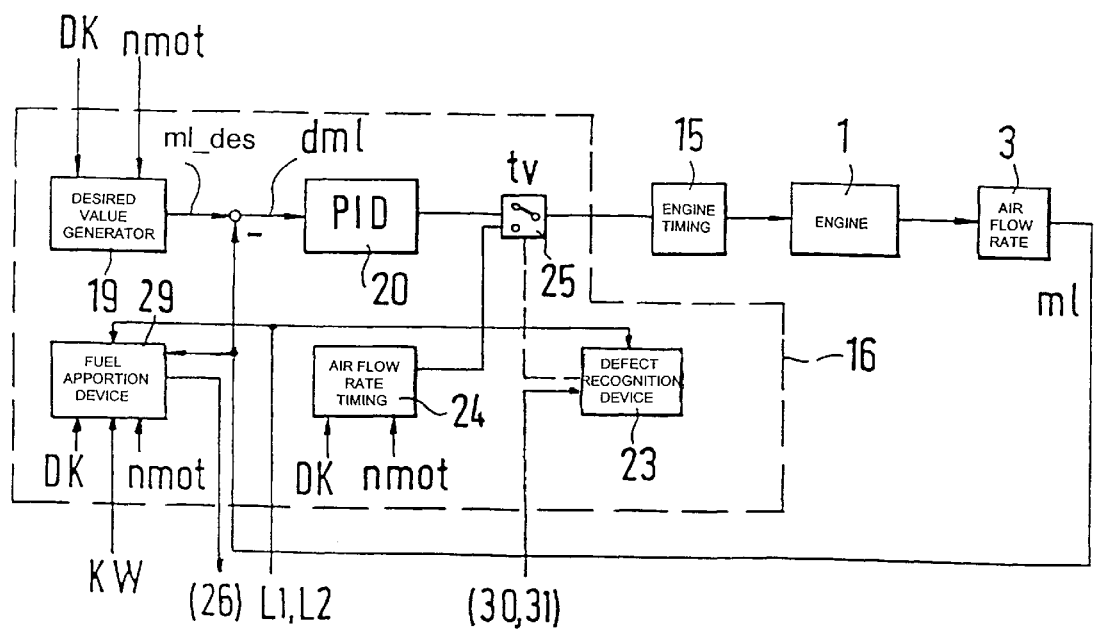
FIG. 2 is a block diagram of an engine timing system with a defect recognition device according to the present invention.

The engine timing 16 is illustrated in detail in the block diagram according to FIG. 2. For the purpose of the rate-of-air-flow control, the internal-combustion engine 1 forms the control path on which the air flow rate meter 3, as the measuring element, determines the actual value of the rate of air flow (ml). This value is fed to the engine timing system 16 and is compared there with a desired value for the rate of air flow (ml_des) which is determined by a desired-value generator 19 as a function of a rotational speed nmot of the internal-combustion engine 1 and of a throttle valve position DK of the throttle valve 8. The result of this comparison is a deviation value (dml) which is supplied to a PID-controller 20 also contained in the engine timing rate-of-air-flow controller 16. This PID-controller 20 furnishes as an actuating variable a pulse-width timing ratio signal (tv) to the timing valve 15 and thus controls the bypass valves 13, 14 operating as the supercharging pressure actuators.

A fuel apportioning device 29, also arranged in the engine timing system 16, calculates from the actual value of the rate of air flow ml, the rotational speed nmot, the throttle valve position DK and a crankshaft angle KW signals for triggering the injection valves 26. In this case, the fuel-air ratio to be set is determined for the whole internal-combustion engine 1 from the main timing quantities: air flow rate ml, rotational speed nmot and throttle valve position DK. The fuel supply will then take place uniformly by way of all injection nozzles 26.

A defect in one of the exhaust gas trains, for example, the left exhaust gas train, which reduces the exhaust gas flow rate now has the result that the rate of air flow recorded by the air flow rate meter 3 decreases. This results in a rise of the deviation dml, and the PID-controller closes the bypass valves 13 and 14 by way of the timing ratio tv. As a result, the rotational speed of the right exhaust gas turbocharger 5 rises considerably in the right exhaust gas train 22. The exhaust gas flow rate reduced by the defect in the left exhaust gas train 21 results in a clearly lower rise of the rotational speed of the left exhaust gas turbocharger 4.

The rotational speed of the right exhaust gas turbocharger 5 can therefore rapidly reach a critical range and thus lead to the destruction of the exhaust gas turbocharger 5.

In order to recognize this, a defect recognition device 23 monitors the signals L1, L2 of the lambda probes 27 and 28 in the engine timing system 16. Inside the defect recognition device 23, a difference between the signals L1 and L2 is formed. Then the amount of this difference is compared with a limit value in order to differentiate smaller deviations of the signals L1 and L2 caused by manufacturing and operating tolerances from a difference caused by a defect. If the amount of the difference exceeds the preset limit value, a change-over switch 25 is activated. The switch 25 is arranged in front of the timing valve 15. The timing valve 15 is then controlled by an air flow rate timing device 24 instead of the PID-controller 20. The air flow rate timing device 24 determines the timing ratio tv from the rotational speed nmot and the throttle valve position DK.

If the described defect recognition device 23 is constructed in the form of a software program in a control unit, it is self-evident that the switch-over takes place in such a manner that a timing program for the rate of air flow ml, in the event of a recognized one-sided defect, does not branch to a subroutine for the rate-of-air-flow control but to a subroutine for the rate-of-air-flow timing.

Such a program for recognizing defects can recognize a defect in one side of the two exhaust gas trains 21, 22 in that the following acts are carried out: (1) reading-in of the signals L1 and L2 from the lambda probes 27 and 28; (2) calculating the amount of the difference between the lambda values L1 and L2; (3) comparing the amount of the difference with a limit value; and (4) if the limit value is exceeded: emitting a defect signal and branching out to a subroutine for the rate-of-air-flow timing; or (5) if the limit values is not exceeded: branching out to a subroutine for the rate-of-air-flow control.

The defect recognition illustrated in the example of a rate-of-air-flow control can be used for any other control affecting the air flow supplied to a supercharged internal-combustion engine; this also applies to supercharging pressure controls.

In addition, adjusting devices 30 31 for adjusting the relative position of the intake camshaft (not shown) are provided on the internal-combustion engine 1. By means of these adjusting devices 30, 31, the intake camshaft can be brought from a basic position with a late intake start and a low crossover into a working position with an early intake start and a large crossover. In the case of the concerned cylinders of the internal-combustion engine 1, this adjustment changes the volumetric efficiency and therefore also the fuel-air mixture which is required for achieving a defined exhaust gas composition (remainder- oxygen). The two adjusting devices 30, 31, act independently of one another in each case upon one half of the internal-combustion engine.

If, as the result of a one-sided defect, for example, on the second adjusting device 31, there is no adjustment of the intake camshaft on this side of the internal-combustion engine, the two halves of the internal-combustion engine 1 will have different volumetric efficiencies. Since the fuel apportioning device 29 determines the fuel-air ratio for the whole internal-combustion engine 1, the different volumetric efficiencies in the case of the same fuel supply for all cylinders result in a different exhaust gas composition in the exhaust gas trains 21 and 22. As the result of the different exhaust gas composition, the lambda values L1 and L2 generated by the lambda probes 27 and 28 will also differ so that the difference between the lambda values L1 and L2 exceeds the limit value and the defect recognition device 23 generates a defect signal. Since this defect signal has occurred immediately following the operating of the adjusting device 30, the defect recognition device 23 can assign this defect directly to the adjusting device 30.

Depending on the design of the internal-combustion engine 1, the activation of the change-over switch 25 can also be suppressed if it is to be assumed that a failure of one of the adjusting devices 30, 31 will not result in damage to the internal-combustion engine 1. As an alternative, such a defect signal can also be used for taking back an operation of the adjusting devices 30, 31 and for suppressing further operations until, within the scope of a repair shop visit or the like, the operation of the adjusting device 30 and 31 is released again.

As another alternative, the adjusting devices 30, 31 are provided for adjusting the valve stroke of inlet valves and/or outlet valves of the internal-combustion engine. Also in this case, a one-sided failure of one of the adjusting devices 30 or 31, because the valve stroke is changed on one side, leads to different volumetric efficiencies of the cylinders assigned to the exhaust gas trains 21, 22 and thus to different exhaust gas compositions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A defect recognition device for an internal-combustion engine having at least two exhaust gas trains, a joint measuring device for detecting supplied air, and a joint timing device for metering fuel, the defect recognition device comprising:

first and second lambda probes respectively arranged in first and second ones of said at least two exhaust gas trains, said first and second lambda probes generating continuous lambda value signals for the exhaust gas; and wherein a defect is recognized when the continuous lambda value signals generated by the first and second lambda probes deviate from one another.

2. The defect recognition device for the internal-combustion engine further having exhaust gas turbochargers arranged in the exhaust gas trains according to claim 1, the defect recognition device further comprising:

an actuator for the supplied air acting upon the exhaust gas turbochargers;

a regulator for the supplied air, said regulator controlling the actuator so as to match a value of the supplied air from the joint measuring device with a desired value;

a timing device for the supplied air, said timing device controlling the actuator as a function of operating variables of the internal-combustion engine; and wherein the defect recognition device changes-over from a triggering of the actuator via the regulator to a triggering of the actuator via the timing device when the defect is recognized.

3. The defect recognition device according to claim 2, further comprising an adjusting device of the internal-combustion engine for adjusting a relative position of cam shafts, wherein the defect recognition device recognizes a defect in the adjusting device when signals supplied by the first and second lambda probes deviate from one another upon operation of the adjusting device.

4. The defect recognition device according to claim 2, further comprising a valve stroke adjusting device of the internal-combustion engine for adjusting a valve stroke of inlet and/or outlet valves, wherein the defect recognition device recognizes a defect in the valve stroke adjusting device when signals supplied by the first and second lambda probes deviate from one another upon operating the valve stroke adjusting device.

5. The defect recognition device according to claim 1, further comprising an adjusting device of the internal-combustion engine for adjusting a relative position of cam shafts, wherein the defect recognition device recognizes a defect in the adjusting device when signals supplied by the first and second lambda probes deviate from one another upon operation of the adjusting device.

6. The defect recognition device according to claim 1, further comprising a valve stroke adjusting device of the internal-combustion engine for adjusting a valve stroke of inlet and/or outlet valves, wherein the defect recognition device recognizes a defect in the valve stroke adjusting device when signals supplied by the first and second lambda probes deviate from one another upon operating the valve stroke adjusting device.

7. A defect recognition device for an internal-combustion engine having at least two exhaust gas trains, the device comprising:

first and second continuous signal generating lambda probes respectively arranged in first and second ones of the two exhaust gas trains, the first and second lambda probes providing a continuous signal lambda value output for exhaust gas in the respective exhaust gas train; and wherein a defect is recognized when the continuous signal lambda values from the first and second lambda probes deviate from one another.

8. The defect recognition device according to claim 7, further comprising means for detecting whether the continuous signal lambda value outputs from the first and second lambda probes deviate from one another.

9. The defect recognition device according to claim 7, further comprising:
a measuring device for measuring supplied air jointly for the two exhaust gas trains and providing the measured value as a regulating variable;
a supplied air actuator which acts upon exhaust gas turbochargers arranged in the exhaust gas trains;
a supplied air regulator which controls the supplied air actuator to match a value of the supplied air with a desired value; and
a supplied air timing device which controls the supplied air actuator as a function of operating variables of the internal-combustion engine, wherein the supplied air actuator is triggered by the supplied air regulator under normal operating conditions and by the supplied air timing device when the defect is recognized.

10. The defect recognition device according to claim 9, further comprising a cam shaft adjusting device for the internal-combustion engine, wherein when the continuous lambda value output signals from the first and second lambda probes deviate from one another upon operation of the cam shaft adjusting device, the defect recognition device recognizes a defect in the cam shaft adjusting device.

11. The defect recognition device according to claim 9, further comprising a valve stroke adjusting device for the internal-combustion engine, wherein when the continuous lambda value output signals from the first and second lambda probes deviate from one another upon operation of the valve stroke adjusting device, the defect recognition device recognizes a defect in the valve stroke adjusting device.

12. A process for operating an internal-combustion engine, the process comprising the acts of:
determining a lambda value of exhaust gas in each of at least two exhaust gas trains;
calculating a difference between the determined lambda values;
comparing the calculated difference with a limit value; and
emitting a defect signal when the calculated difference is larger than the limit value.

13. The process according to claim 12, further comprising the acts of:
determining an actuating value for triggering an actuator for supplied air which acts upon all exhaust gas turbochargers of the internal-combustion engine by a process for controlling the supplied air if no defect signal is present; or
determining the actuating value for triggering the actuator via a process for timing the supplied air when a defect signal is emitted.

14. The process according to claim 13, wherein the act of emitting a defect signal further comprises the acts of:
implementing the process when a cam shaft adjusting device is operated for adjusting relative positions of cam shafts of the internal-combustion engine; and
assigning the defect signal to the cam shaft adjusting device if the defect signal occurs for the first time within a time window after operation of the cam shaft adjusting device.

15. The process according to claim 13, wherein the act of emitting a defect signal further comprises the acts of:
implementing the process when a valve stroke adjusting device is operated for adjusting the valve stroke inlet and/or outlet valves of the internal-combustion engine; and
assigning the defect signal to the valve stroke adjusting device if the defect signal occurs for the first time within a time window after operation of the valve stroke adjusting device.

16. The process according to claim 12, wherein the act of emitting a defect signal further comprises the acts of:
implementing the process when a cam shaft adjusting device is operated for adjusting relative positions of cam shafts of the internal-combustion engine; and
assigning the defect signal to the cam shaft adjusting device if the defect signal occurs for the first time within a time window after operation of the cam shaft adjusting device.

17. The process according to claim 12, wherein the act of emitting a defect signal further comprises the acts of:
implementing the process when a valve stroke adjusting device is operated for adjusting the valve stroke inlet and/or outlet valves of the internal-combustion engine; and
assigning the defect signal to the valve stroke adjusting device if the defect signal occurs for the first time within a time window after operation of the valve stroke adjusting device.

18. A software product for operating a defect recognition system of an internal-combustion engine, the product comprising a computer readable medium having stored thereon code segments that:
calculate a difference between continuously generated lambda value output signals for exhaust gas in each of at least two exhaust gas trains of the internal-combustion engine;
compare the calculated difference with a limit value; and
emit a defect signal when the calculated difference is larger than the limit value.

* * * * *